United States Patent
Lin et al.

(10) Patent No.: US 9,383,866 B2
(45) Date of Patent: Jul. 5, 2016

(54) IMAGE SENSING APPARATUS, OPTICAL TOUCH CONTROL APPARATUS AND MOTION TRACKING APPARATUS UTILIZING THE IMAGE SENSING APPARATUS

(71) Applicant: PixArt Imaging Inc., Hsin-Chu (TW)

(72) Inventors: Yung-Chang Lin, Hsin-Chu (TW); Tsung-Fa Wang, Hsin-Chu (TW); Ching-Lin Chung, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 366 days.

(21) Appl. No.: 13/910,139

(22) Filed: Jun. 5, 2013

(65) Prior Publication Data

US 2014/0132565 A1 May 15, 2014

(30) Foreign Application Priority Data

Nov. 13, 2012 (CN) .......................... 2012 1 0452023

(51) Int. Cl.
*G06F 3/042* (2006.01)
(52) U.S. Cl.
CPC .................................... *G06F 3/0425* (2013.01)

(58) Field of Classification Search
CPC ....................................................... G06F 3/042
USPC .................................................. 345/166, 175
See application file for complete search history.

(56) References Cited

U.S. PATENT DOCUMENTS

| 8,928,626 B2* | 1/2015 | Song | G06F 3/042 250/201.1 |
|---|---|---|---|
| 8,937,588 B2* | 1/2015 | Wheatley | G09G 5/00 345/156 |
| 2011/0199336 A1* | 8/2011 | Kao | G06F 1/3262 345/175 |
| 2012/0075249 A1* | 3/2012 | Hoch | G06F 3/044 345/174 |

* cited by examiner

*Primary Examiner* — Kwang-Su Yang
(74) *Attorney, Agent, or Firm* — Winston Hsu; Scott Margo

(57) ABSTRACT

An image sensing apparatus, comprising: a control unit; and an image sensor, wherein the control unit controls the image sensor to utilize a first image sensing region to sense a first image to output a first image signal in a first mode, wherein the control unit controls the image sensor to utilize a second image sensing region to sense a second image to output a second image signal in a second mode. The first image sensing region is smaller than a total image sensing region of the image sensor, and the second image sensing region is smaller than the first image sensing region.

12 Claims, 7 Drawing Sheets

IMAGE SENSING APPARATUS, OPTICAL TOUCH CONTROL APPARATUS AND MOTION TRACKING APPARATUS UTILIZING THE IMAGE SENSING APPARATUS

BACKGROUND OF THE INVENTION

1. Field of the Invention

The present invention relates to an image sensing apparatus, and an optical touch control apparatus and a motion tracking apparatus utilizing the image sensing apparatus, and particularly relates to an image sensing apparatus, and an optical touch control apparatus and a motion tracking apparatus, which can change a size of an image sensing region.

2. Description of the Prior Art

In the prior art, a sensing region of an image sensor is fixed. For example, a total image sensing region of the image sensor is utilized to sense an image. However, such mechanism consumes large power and wrong image might be detected. FIG. 1 is a schematic diagram illustrating how a prior art image sensor utilizes a total image sensing region to sense an image. As shown in FIG. 1, the image sensor 100 utilizes all sensing region of the image sensor (i.e. a total image sensing region, a matrix with M×N pixels in this example) to sense an image. However, the image sensor may have a disturbance region P caused by dust or dirt, such that the image sensed by the image sensor 100 may include an image caused by the disturbance region P. Therefore, a wrong image is sensed.

SUMMARY OF THE INVENTION

One objective of the present invention is to provide an image sensing apparatus that can change image sensing regions.

Another objective of the present invention is to provide an optical touch control apparatus that can change image sensing regions.

Another objective of the present invention is to provide a motion tracking apparatus that can change image sensing regions.

One embodiment of the present invention discloses an image sensing apparatus, comprising: a control unit; and an image sensor, wherein the control unit controls the image sensor to utilize a first image sensing region to sense a first image to output a first image signal in a first mode, wherein the control unit controls the image sensor to utilize a second image sensing region to sense a second image to output a second image signal in a second mode. The first image sensing region is smaller than a total image sensing region of the image sensor, and the second image sensing region is smaller than the first image sensing region.

Another embodiment of the present invention discloses an optical touch control apparatus, which comprises: a sensing surface; a light source, for emitting light to an object on the sensing surface; a control unit; and an image sensor, wherein the control unit controls the image sensor to utilize a first image sensing region to sense a first image to output a first image signal in a first mode, where the control unit controls the image sensor to utilize a second image sensing region to sense a second image to output a second image signal in a second mode, wherein the control unit computes a touch control operation for the object on the sensing surface according to the first image signal or the second image signal. The first image sensing region is smaller than a total image sensing region of the image sensor, and the second image sensing region is smaller than the first image sensing region.

Still another embodiment of the present invention discloses a motion tracking apparatus comprising a display and a remote controller. The display comprises at least one light source provided thereon. The remote controller comprises a control unit and an image sensor, wherein the control unit controls the image sensor to utilize a first image sensing region to sense a first image to output a first image signal in a first mode, where the control unit controls the image sensor to utilize a second image sensing region to sense a second image to output a second image signal in a second mode, wherein the control unit computes a location of the light source according to the first image or the second image and computes relative motion between the remote controller and the light source according to a location of the light source. The first image sensing region is smaller than a total image sensing region of the image sensor, and the second image sensing region is smaller than the first image sensing region.

In view of above-mentioned embodiment, proper sensing regions can be utilized corresponding to different modes. By this way, the power consumption can decrease and a correct image can be acquired.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
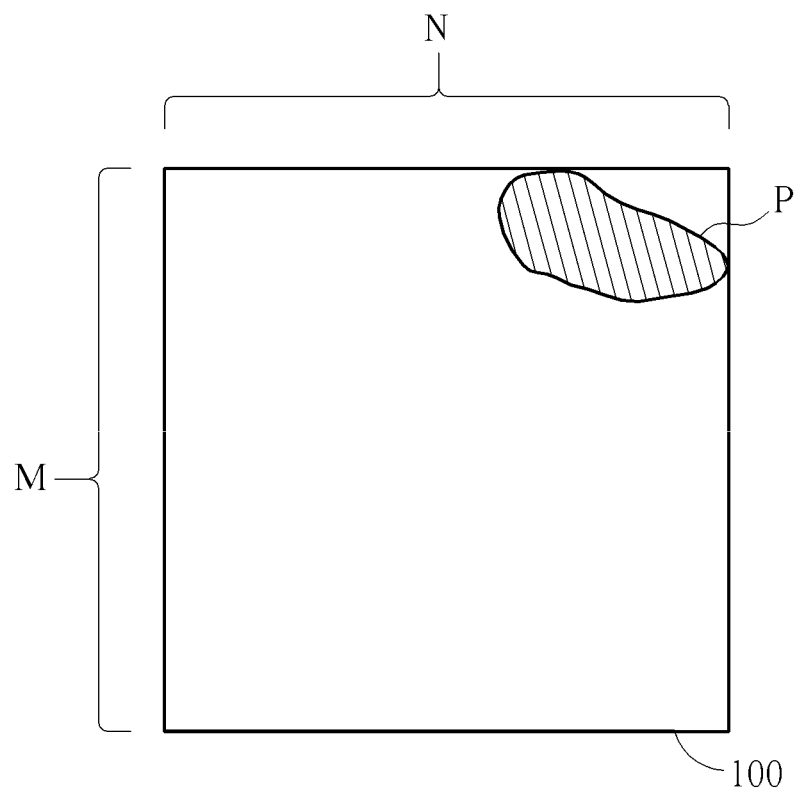
FIG. 1 is a schematic diagram illustrating how a prior art image sensor utilizes a total image sensing region to sense an image.
Figure 2:
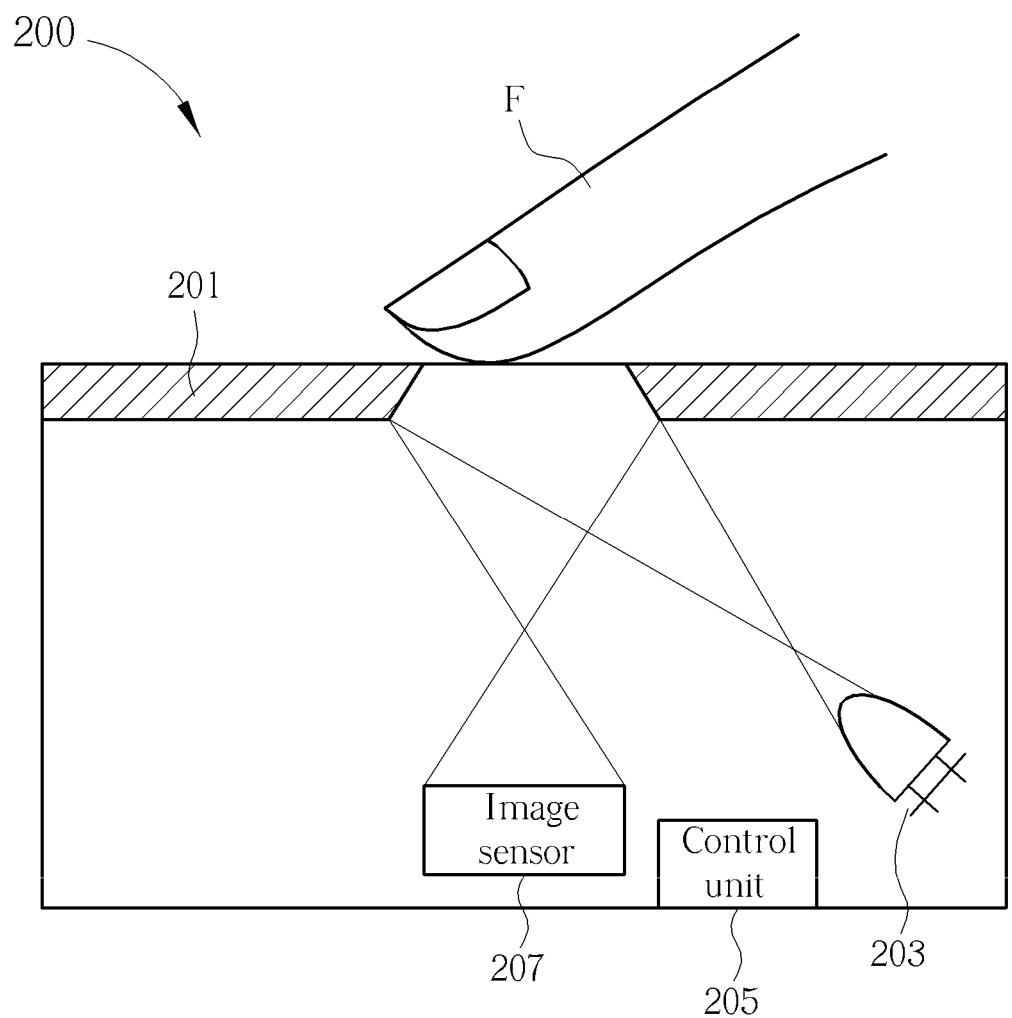
FIG. 2 is a schematic diagram illustrating an optical touch control apparatus according to one embodiment of the present invention.

FIG. 2 is a schematic diagram illustrating an optical touch control apparatus according to one embodiment of the present invention. FIG. 3, FIG. 4, FIG. 5 and FIG. 6 are schematic diagrams illustrating operations of the optical touch control apparatus shown in FIG. 2. As shown in FIG. 2, the optical control apparatus 200 comprises a sensing surface 201, a light source 203, a control unit 205 and an image sensor 207. The light source 203 emits light to an object on the sensing surface 201 (a finger F in this embodiment). The image sensor 207 is arranged to sense an image, thus the light source 203 emits light to the finger F and the light is reflected to the image sensor 207 if the distance between the finger F and image sensor 207 is smaller than a predetermined distance (i.e. a touch control operation occurs). By this way, the image sensor 207 senses an image of the finger F. Also, the control unit 205 computes touch control operation for the finger F on the sensing surface 201 according to an image of the finger F.

The image sensor 207 utilizes different image sensing regions to sense images in different modes. Please refer to FIG. 3, the image sensor 300 utilizes a first image sensing region $W_1$ to sense an image to thereby generate a corresponding first image signal in the first mode. The first image sensing region $W_1$ includes only a part of the total image sensing region of the image sensor 300 and excludes the disturbance region P. By this way, power consumption decreases and a more correct image can be sensed. The size and the location of the first image sensing region $W_1$ can be determined by various determining mechanisms. For example, it can be determined which part of the image sensor is not suitable for sensing according to the image sensor manufacturing process, such that the first image sensing region $W_1$ can exclude these parts. Alternatively, the disturbance region P can be determined first and then the first image sensing region $W_1$ can be designed to exclude the disturbance region P. Many methods can be utilized to determine a location of the disturbance region P. For example, if a fixed image has been found in a plurality of images, the fixed image can be determined to be the disturbance region P. However, disturbance region P is not limited to be determined via this method. Additionally, the first image sensing region $W_1$ can be other shapes besides a rectangle, and can be non-continuous shapes. Please refer to the embodiment shown in FIG. 4, the first image sensing region $W_1$ can be formed by different bar shape sensing regions.

Figure 3:
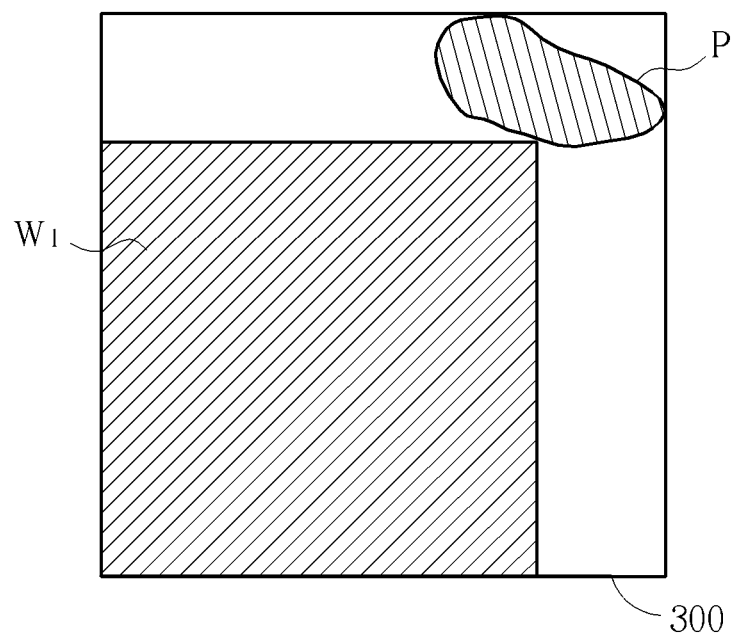
FIG. 3, FIG. 4, FIG. 5 and FIG. 6 are schematic diagrams illustrating operations of the optical touch control apparatus shown in FIG. 2.
Figure 4:
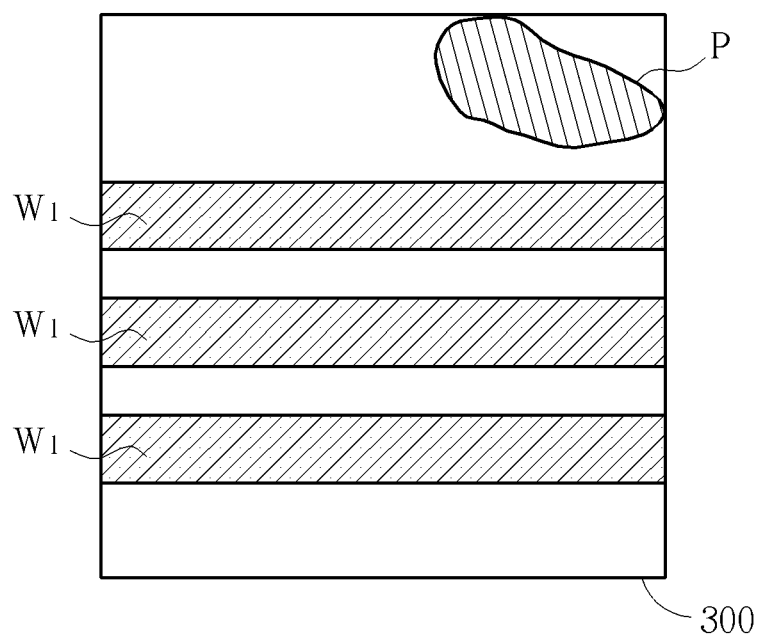
Figure 5:
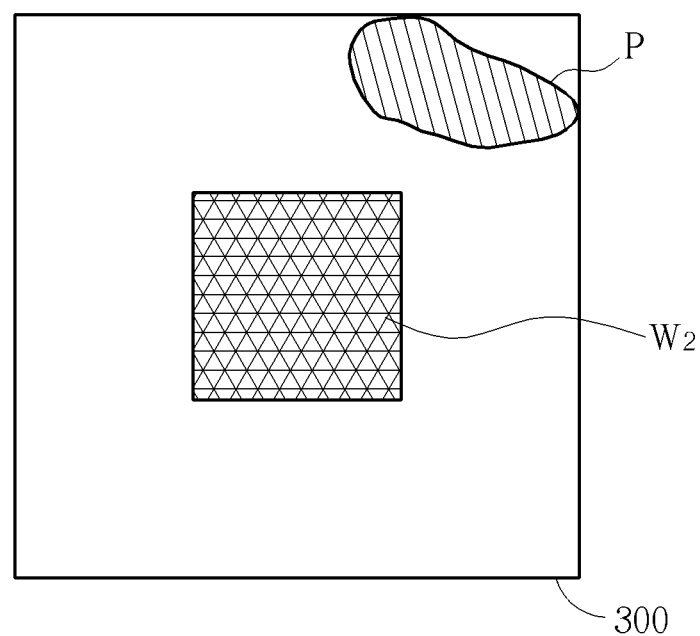
Figure 6:
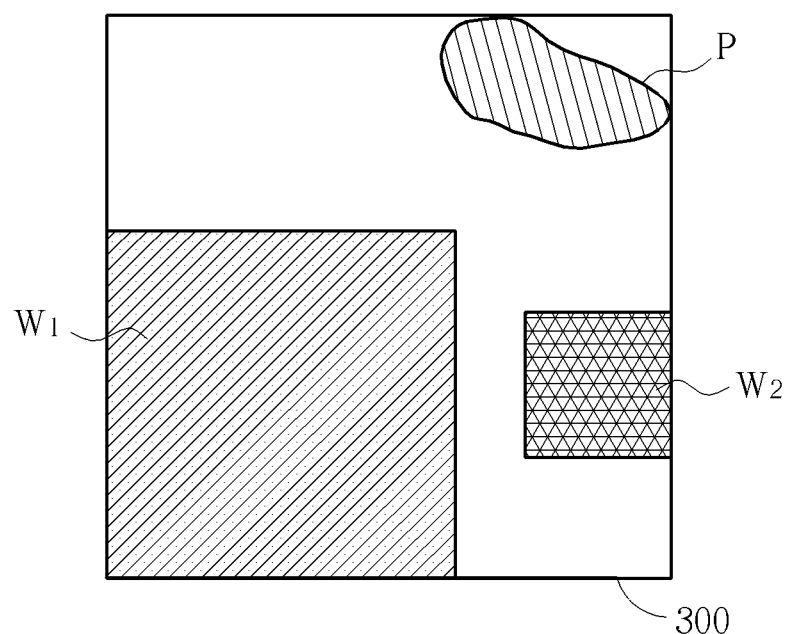

The image sensor 207 utilizes a second image sensing region $W_2$ smaller than the first image sensing region $W_1$ to sense an image to thereby generate a corresponding second image signal in the second mode, as shown in FIG. 5. The locations of the first image sensing region $W_1$ and the second image sensing region $W_2$ can be that the first image sensing region $W_1$ includes the second image sensing region $W_2$, as shown in FIG. 3 and FIG. 5. Additionally, the locations of the first image sensing region $W_1$ and the second image sensing region $W_2$ can be that the first image sensing region $W_1$ and the second image sensing region $W_2$ do not overlap to each other, as shown in FIG. 6. In one embodiment, the control unit 205 determines if a fixed image exists in a sensing region of the image sensor 207 according to the first image signal or the second image signal, and compensates the fixed image while utilizing the first image sensing region $W_1$ or the second image sensing region $W_2$ to sense an image. Such compensation step can be regarded as a step for decreasing an image noise, which can help the image sensor sense a more correct image. How to determine a fixed image and compensate it is well known by persons skilled in the art, thus it is omitted for brevity here.

In one embodiment, the first mode is a normal mode and the second mode is a sleeping mode. That is, the image sensor 207 utilizes the first image sensing region $W_1$ to sense the image while in the normal mode and utilizes the second image sensing region $W_2$ smaller than the first image sensing region $W_1$ to sense the image while in the sleeping mode. Furthermore, the control unit 205 controls the image sensor 207 to utilize the second image sensing region $W_2$ to sense if a distance between the finger F and the sensing surface 201 is smaller than a threshold value (i.e. sense if a touch control operation occurs). If yes, the control unit 205 switches the optical touch control apparatus 200 back to the first mode. If not, the control unit 205 keeps the optical touch control apparatus 200 in the second mode. For more detail, if the distance between the finger F and the sensing surface 201 is larger than the threshold value (i.e. no touch control operation occurs), the image sensor 207 does not receive light reflected from the finger F, such that the brightness is low. On the contrary, if the distance between the finger F and the sensing surface 201 is smaller than the threshold value (i.e. a touch control operation occurs), the image sensor 207 receives light reflected from the finger F, such that the brightness is high. Accordingly, the control unit 205 controls the image sensor 207 to utilize the second image sensing region $W_2$ to sense brightness of the image and switches the image sensing apparatus 200 back to the first mode if variation of the brightness is larger than a threshold value, since it means the finger F or other objects are close to the sensing surface if the brightness variation is large. The smaller second image sensing region $W_2$ can be utilized in the second mode, since the step of sensing brightness variation for the whole image does not need a large sensing region.

Figure 7:
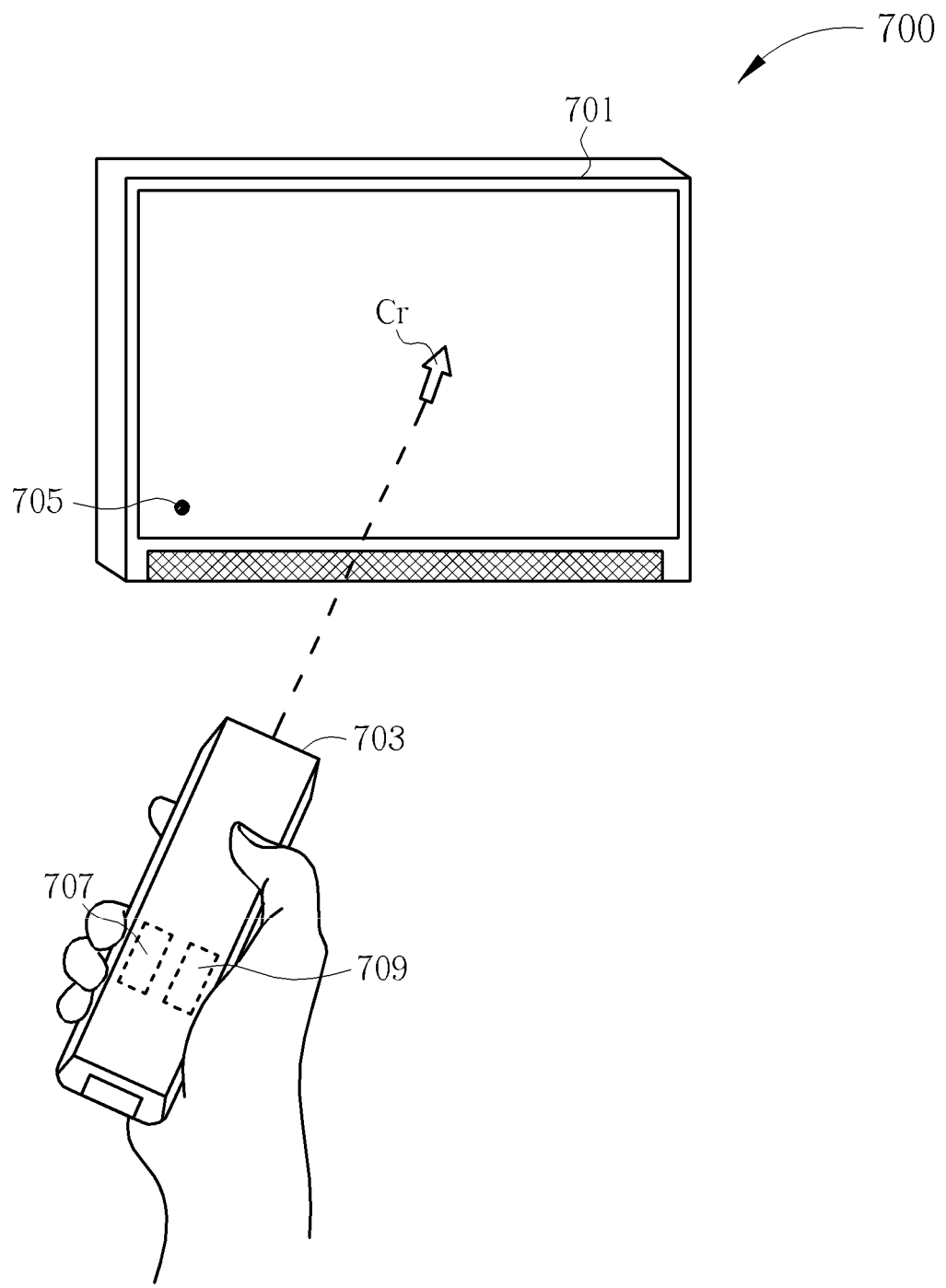
FIG. 7 is a schematic diagram illustrating a motion tracking apparatus according to an embodiment of the present invention.

The image sensing mechanisms shown in FIG. 3 to FIG. 6 can be applied to other electronic apparatuses. That is, the control unit 205 and the image sensor 207 shown in FIG. 2 can be regarded as an image sensing apparatus, which can be applied to other electronic apparatuses. FIG. 7 is a schematic diagram illustrating a motion tracking apparatus according to an embodiment of the present invention. As shown in FIG. 7, the motion tracking apparatus 700 comprises a display 701 and a remote controller 703. The display 701 comprises at least one light source 705 provided thereon (in this example, only one light source is illustrated), and the remote controller 707 comprises a control unit 707 and an image sensor 709. The image sensor 709 can utilize the image sensing mechanisms shown in FIG. 3 to FIG. 6 to sense the image. In one embodiment, the first mode is a normal mode and the second mode is a sleeping mode. In the first mode, the control unit 707 computes a location of the light source 705 according to the sensed image and computes relative motion between the remote controller 703 and the light source 705 according to a location of the light source 705. In one embodiment, the relative motion between the remote controller 703 and the light source 705 is utilized to control a cursor Cr, but it does not mean to limit the present invention. The control unit 707 determines if the sensed image comprises a light source image generated by the light source 705 in the second mode. If yes, the control unit 707 switches the motion tracking apparatus 700 back to the first mode. If not, the control unit 707 controls the motion tracking apparatus to keep in the second mode.

In view of above-mentioned embodiment, proper sensing regions can be utilized corresponding to different modes. By this way, the power consumption can decrease and a correct image can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensing apparatus, comprising:
    a control unit; and
    an image sensor, wherein the control unit controls the image sensor to utilize a first image sensing region to sense a first image to output a first image signal in a first mode, wherein the control unit controls the image sensor to utilize a second image sensing region to sense a second image to output a second image signal in a second mode,
    wherein the first image sensing region is smaller than a total image sensing region of the image sensor, and the second image sensing region is smaller than the first image sensing region,
    wherein the control unit controls the image sensor to utilize the second image sensing region to sense brightness of the second image and switches the image sensing apparatus back to the first mode if variation of the brightness is larger than a threshold value, and
    wherein the control unit controls the image sensing apparatus to keep in the second mode if variation of the brightness is smaller than the threshold value.

2. The image sensing apparatus of claim 1, wherein the control unit determines if a fixed image exists in a sensing region of the image sensor according to the first image signal or the second image signal, and compensates the fixed image while utilizing the first image sensing region or the second image sensing region to sense an image.

3. The image sensing apparatus of claim 1, wherein the image received by the image sensor is generated by reflection light from an object.

4. The image sensing apparatus of claim 1, wherein the image received by the image sensor is generated by incident light from an object.

5. The image sensing apparatus of claim 1, wherein the first image sensing region comprises non-continuous image sensing regions.

6. The image sensing apparatus of claim 1, wherein the first image sensing region comprises the second image sensing region.

7. The image sensing apparatus of claim 1, wherein the first image sensing region and the second image sensing region do not overlap with each other.

8. An optical touch control apparatus, comprising:
- a sensing surface;
- a light source, for emitting light to an object on the sensing surface;
- a control unit; and
- an image sensor, wherein the control unit controls the image sensor to utilize a first image sensing region to sense a first image to output a first image signal in a first mode, wherein the control unit controls the image sensor to utilize a second image sensing region to sense a second image to output a second image signal in a second mode, wherein the control unit computes a touch control operation for the object on the sensing surface according to the first image signal or the second image signal,
- wherein the first image sensing region is smaller than a total image sensing region of the image sensor, and the second image sensing region is smaller than the first image sensing region,
- wherein the control unit controls the image sensor to utilize the second image sensing region to sense brightness of the second image and switches the optical touch control apparatus back to the first mode if variation of the brightness is larger than a threshold value, and
- wherein the control unit controls the optical touch control apparatus to keep in the second mode if variation of the brightness is smaller than the threshold value.

9. The optical touch control apparatus of claim 8, wherein the control unit determines if a fixed image exists in a sensing region of the image sensor according to the first image signal or the second image signal, and compensates the fixed image while utilizing the first image sensing region or the second image sensing region to sense an image.

10. The optical touch control apparatus of claim 8, wherein the first image sensing region comprises non-continuous image sensing regions.

11. The optical touch control apparatus of claim 8, wherein the first image sensing region comprises the second image sensing region.

12. The optical touch control apparatus of claim 8, wherein the first image sensing region and the second image sensing region do not overlap with each other.

* * * * *